(12) United States Patent
Moskowitz et al.

(10) Patent No.: US 8,896,227 B2
(45) Date of Patent: Nov. 25, 2014

(54) DIRECTLY DRIVEN HIGH EFFICIENCY LED CIRCUIT

(75) Inventors: Warren Moskowitz, Ipswich, MA (US); Philip Moskowitz, Georgetown, MA (US)

(73) Assignee: OSRAM SYLVANIA Inc., Danvers, MA (US)

(*) Notice: Subject to any disclaimer, the term of this patent is extended or adjusted under 35 U.S.C. 154(b) by 533 days.

(21) Appl. No.: 13/229,611

(22) Filed: Sep. 9, 2011

(65) Prior Publication Data

US 2012/0229030 A1    Sep. 13, 2012

Related U.S. Application Data

(60) Provisional application No. 61/381,795, filed on Sep. 10, 2010.

(51) Int. Cl.
  *H05B 37/02* (2006.01)
  *H05B 33/08* (2006.01)
(52) U.S. Cl.
  CPC .......... *H05B 33/0809* (2013.01); *H05B 33/089* (2013.01); *H05B 33/083* (2013.01); *Y02B 20/341* (2013.01)
  USPC .................. 315/291; 315/209 R; 315/312
(58) Field of Classification Search
  CPC .. H05B 37/02; H05B 33/083; H05B 33/0887; H05B 33/0809; H05B 33/089; Y02B 20/341
  USPC ...... 315/185 R, 200 R, 209 R, 224–226, 291, 315/307, 308, 312
  See application file for complete search history.

(56) References Cited

U.S. PATENT DOCUMENTS

| | | | |
|---|---|---|---|
| 7,489,086 B2 | 2/2009 | Miskin et al. | |
| 7,501,772 B2 | 3/2009 | Chung et al. | |
| 7,649,326 B2 | 1/2010 | Johnson et al. | |
| 7,679,292 B2 | 3/2010 | Allen et al. | |
| 2004/0233145 A1 | 11/2004 | Chiang | |
| 2008/0094000 A1 | 4/2008 | Yamamoto et al. | |
| 2008/0157689 A1 | 7/2008 | Kato | |
| 2009/0066267 A1 | 3/2009 | Kraus et al. | |
| 2010/0134018 A1 | 6/2010 | Tziony et al. | |
| 2010/0194298 A1 | 8/2010 | Kuwabara | |
| 2010/0308739 A1 | 12/2010 | Shteynberg et al. | |
| 2011/0316441 A1* | 12/2011 | Huynh ......................... 315/291 |

FOREIGN PATENT DOCUMENTS

| | | |
|---|---|---|
| EP | 0955619 A1 | 11/1999 |
| EP | 0967590 A1 | 12/1999 |
| FR | 2901956 A1 | 12/2007 |
| WO | WO2009/013807 | 11/2009 |

* cited by examiner

*Primary Examiner* — Jimmy Vu
(74) *Attorney, Agent, or Firm* — Andrew Martin

(57) ABSTRACT

A system for directly driving light emitting diodes (LEDs). A string of LEDs is coupled across an input voltage and includes a plurality of separate groups of LEDs. Each of a plurality of switches is coupled in parallel with an associated one of the groups of LEDs for controlling current flow through the associated group of LEDs in response to a control signal from a controller circuit. A switch protection circuit is associated with at least one of the switches. The switch protection circuit is configured to place the switch into a conducting state in the event of failure of an LED in the associated group of LEDs.

19 Claims, 12 Drawing Sheets

900

901 COUPLE A STRING OF LEDS ACROSS A VOLTAGE SUPPLY CONFIGURED TO PROVIDE AN INPUT VOLTAGE, THE STRING OF LEDS COMPRISING A PLURALITY OF SEPARATE GROUPS OF LEDS

905 COUPLE A STRING OF LEDS ACROSS A VOLTAGE SUPPLY CONFIGURED TO PROVIDE AN INPUT VOLTAGE, THE STRING OF LEDS COMPRISING A PLURALITY OF SEPARATE GROUPS OF LEDS, WHEREIN AT LEAST ONE OF THE SEPARATE GROUPS OF LEDS COMPRISES A PLURALITY OF SERIES CONNECTED LEDS

906 COUPLE A STRING OF LEDS ACROSS A VOLTAGE SUPPLY CONFIGURED TO PROVIDE AN INPUT VOLTAGE, THE STRING OF LEDS COMPRISING A PLURALITY OF SEPARATE GROUPS OF LEDS, WHEREIN A FIRST ONE OF THE GROUPS OF LEDS COMPRISES A FIRST NUMBER OF LEDS AND A SECOND ONE OF THE GROUPS OF LEDS COMPRISES A SECOND NUMBER OF LEDS, THE FIRST NUMBER BEING DIFFERENT FROM THE SECOND NUMBER

902 CONFIGURE A PLURALITY OF SWITCHES, EACH OF THE SWITCHES BEING COUPLED IN PARALLEL WITH AN ASSOCIATED ONE OF THE GROUPS OF LEDS FOR CONTROLLING CURRENT FLOW THROUGH THE ASSOCIATED GROUP OF LEDS IN RESPONSE TO A CONTROL SIGNAL FROM A CONTROLLER CIRCUIT

903 ASSOCIATE A SWITCH PROTECTION CIRCUIT WITH AT LEAST ONE OF THE SWITCHES, THE SWITCH PROTECTION CIRCUIT CONFIGURED TO PLACE THE AT LEAST ONE OF THE SWITCHES INTO A CONDUCTING STATE IN THE EVENT OF FAILURE OF AN LED IN THE ASSOCIATED GROUP OF LEDS, WHEREIN THE FAILURE PLACES THE LED INTO AN OPEN STATE

904 ASSOCIATE A SWITCH PROTECTION CIRCUIT WITH AT LEAST ONE OF THE SWITCHES, THE SWITCH PROTECTION CIRCUIT CONFIGURED TO PLACE THE AT LEAST ONE OF THE SWITCHES INTO A CONDUCTING STATE IN THE EVENT OF FAILURE OF AN LED IN THE ASSOCIATED GROUP OF LEDS, WHEREIN THE FAILURE PLACES THE LED INTO AN OPEN STATE, AND WHEREIN THE AT LEAST ONE OF THE SWITCHES COMPRISES A METAL-OXIDE-SEMICONDUCTOR FIELD-EFFECT TRANSISTOR (MOSFET) AND THE SWITCH PROTECTION CIRCUIT COMPRISES A RESISTOR ELECTRICALLY COUPLED BETWEEN THE DRAIN AND THE GATE OF THE MOSFET

1001 COUPLE A STRING OF LEDS ACROSS A VOLTAGE SUPPLY CONFIGURED TO PROVIDE AN INPUT VOLTAGE, THE STRING OF LEDS COMPRISING A PLURALITY OF SEPARATE GROUPS OF LEDS

1002 CONFIGURE A PLURALITY OF SWITCHES, EACH OF THE SWITCHES BEING COUPLED IN PARALLEL WITH AN ASSOCIATED ONE OF THE GROUPS OF LEDS FOR CONTROLLING CURRENT FLOW THROUGH THE ASSOCIATED GROUP OF LEDS IN RESPONSE TO A CONTROL SIGNAL FROM A CONTROLLER CIRCUIT

1003 ASSOCIATE A SWITCH PROTECTION CIRCUIT WITH AT LEAST ONE OF THE SWITCHES, THE SWITCH PROTECTION CIRCUIT CONFIGURED TO PLACE THE AT LEAST ONE OF THE SWITCHES INTO A CONDUCTING STATE IN THE EVENT OF FAILURE OF AN LED IN THE ASSOCIATED GROUP OF LEDS, WHEREIN THE FAILURE PLACES THE LED INTO AN OPEN STATE

1007 ASSOCIATE A CONTROLLER PROTECTION CIRCUIT WITH THE AT LEAST ONE OF THE SWITCHES, THE CONTROLLER PROTECTION CIRCUIT CONFIGURED TO ISOLATE THE CONTROLLER CIRCUIT FROM A VOLTAGE APPLIED ACROSS THE AT LEAST ONE OF THE SWITCHES

1008 ASSOCIATE A CONTROLLER PROTECTION CIRCUIT WITH THE AT LEAST ONE OF THE SWITCHES, THE CONTROLLER PROTECTION CIRCUIT CONFIGURED TO ISOLATE THE CONTROLLER CIRCUIT FROM A VOLTAGE APPLIED ACROSS THE AT LEAST ONE OF THE SWITCHES, WHEREIN THE CONTROLLER PROTECTION CIRCUIT COMPRISES A DIODE

1009 ASSOCIATE A CONTROLLER PROTECTION CIRCUIT WITH THE AT LEAST ONE OF THE SWITCHES, THE CONTROLLER PROTECTION CIRCUIT CONFIGURED TO ISOLATE THE CONTROLLER CIRCUIT FROM A VOLTAGE APPLIED ACROSS THE AT LEAST ONE OF THE SWITCHES, WHEREIN THE AT LEAST ONE OF THE SWITCHES IS A METAL-OXIDE-SEMICONDUCTOR FIELD-EFFECT TRANSISTOR (MOSFET) AND THE CONTROL SIGNAL IS COUPLED TO A GATE OF THE MOSFET THROUGH THE DIODE

1101 COUPLE A STRING OF LEDS ACROSS A VOLTAGE SUPPLY CONFIGURED TO PROVIDE AN INPUT VOLTAGE, THE STRING OF LEDS COMPRISING A PLURALITY OF SEPARATE GROUPS OF LEDS

1102 CONFIGURE A PLURALITY OF SWITCHES, EACH OF THE SWITCHES BEING COUPLED IN PARALLEL WITH AN ASSOCIATED ONE OF THE GROUPS OF LEDS FOR CONTROLLING CURRENT FLOW THROUGH THE ASSOCIATED GROUP OF LEDS IN RESPONSE TO A CONTROL SIGNAL FROM A CONTROLLER CIRCUIT

1110 CONFIGURE A PLURALITY OF SWITCHES, EACH OF THE SWITCHES BEING COUPLED IN PARALLEL WITH AN ASSOCIATED ONE OF THE GROUPS OF LEDS FOR CONTROLLING CURRENT FLOW THROUGH THE ASSOCIATED GROUP OF LEDS IN RESPONSE TO A CONTROL SIGNAL FROM A CONTROLLER CIRCUIT, WHEREIN THE CONTROLLER CIRCUIT COMPRISES: A OPERATIONAL AMPLIFIER CIRCUIT TO COMPARE A SIGNAL REPRESENTATIVE OF THE CURRENT FLOW TO THE A REFERENCE VOLTAGE REPRESENTATIVE OF THE INPUT VOLTAGE AND MAINTAIN A BALANCE BETWEEN THE CURRENT FLOW AND THE INPUT VOLTAGE BY ADJUSTING THE CONTROL SIGNAL IN RESPONSE TO THE COMPARISON; A POWER SUPPLY CIRCUIT CONFIGURED TO GENERATE A DIRECT CURRENT (DC) VOLTAGE FROM THE INPUT VOLTAGE AND PROVIDE THE DC VOLTAGE TO A POWER INPUT OF THE OPERATIONAL AMPLIFIER CIRCUIT; AND A HARMONIC DISTORTION CONTROL CIRCUIT CONFIGURED TO INJECT A FRACTION OF THE INPUT VOLTAGE TO THE POWER INPUT

1103 ASSOCIATE A SWITCH PROTECTION CIRCUIT WITH AT LEAST ONE OF THE SWITCHES, THE SWITCH PROTECTION CIRCUIT CONFIGURED TO PLACE THE AT LEAST ONE OF THE SWITCHES INTO A CONDUCTING STATE IN THE EVENT OF FAILURE OF AN LED IN THE ASSOCIATED GROUP OF LEDS, WHEREIN THE FAILURE PLACES THE LED INTO AN OPEN STATE

1201 COUPLE A STRING OF LEDS ACROSS A VOLTAGE SUPPLY CONFIGURED TO PROVIDE AN INPUT VOLTAGE, THE STRING OF LEDS COMPRISING A PLURALITY OF SEPARATE GROUPS OF LEDS

1211 COUPLE A STRING OF LEDS ACROSS A VOLTAGE SUPPLY CONFIGURED TO PROVIDE AN INPUT VOLTAGE, THE STRING OF LEDS COMPRISING A PLURALITY OF SEPARATE GROUPS OF LEDS, WHEREIN A FIRST ONE OF THE GROUPS OF LEDS COMPRISES A FIRST NUMBER OF LEDS AND A SECOND ONE OF THE GROUPS OF LEDS COMPRISES A SECOND NUMBER OF LEDS, THE FIRST NUMBER BEING DIFFERENT FROM THE SECOND NUMBER

1202 CONFIGURE A PLURALITY OF SWITCHES, EACH OF THE SWITCHES BEING COUPLED IN PARALLEL WITH AN ASSOCIATED ONE OF THE GROUPS OF LEDS FOR CONTROLLING CURRENT FLOW THROUGH THE ASSOCIATED GROUP OF LEDS IN RESPONSE TO A CONTROL SIGNAL FROM A CONTROLLER CIRCUIT

1203 ASSOCIATE A SWITCH PROTECTION CIRCUIT WITH AT LEAST ONE OF THE SWITCHES, THE SWITCH PROTECTION CIRCUIT CONFIGURED TO PLACE THE AT LEAST ONE OF THE SWITCHES INTO A CONDUCTING STATE IN THE EVENT OF FAILURE OF AN LED IN THE ASSOCIATED GROUP OF LEDS, WHEREIN THE FAILURE PLACES THE LED INTO AN OPEN STATE

1212 ASSOCIATE A CONTROLLER PROTECTION CIRCUIT WITH THE AT LEAST ONE OF THE SWITCHES, THE CONTROLLER PROTECTION CIRCUIT CONFIGURED TO ISOLATE THE CONTROLLER CIRCUIT FROM A VOLTAGE APPLIED ACROSS THE AT LEAST ONE OF THE SWITCHES, WHEREIN THE CONTROLLER CIRCUIT COMPRISES: A OPERATIONAL AMPLIFIER CIRCUIT TO COMPARE A SIGNAL REPRESENTATIVE OF THE CURRENT FLOW TO THE A REFERENCE VOLTAGE REPRESENTATIVE OF THE INPUT VOLTAGE AND MAINTAIN A BALANCE BETWEEN THE CURRENT FLOW AND THE INPUT VOLTAGE BY ADJUSTING THE CONTROL SIGNAL IN RESPONSE TO THE COMPARISON; A POWER SUPPLY CIRCUIT CONFIGURED TO GENERATE A DIRECT CURRENT (DC) VOLTAGE FROM THE INPUT VOLTAGE AND PROVIDE THE DC VOLTAGE TO A POWER INPUT OF THE OPERATIONAL AMPLIFIER CIRCUIT; AND A HARMONIC DISTORTION CONTROL CIRCUIT CONFIGURED TO INJECT A FRACTION OF THE INPUT VOLTAGE TO THE POWER INPUT

FIG. 12

DIRECTLY DRIVEN HIGH EFFICIENCY LED CIRCUIT

CROSS-REFERENCE TO RELATED APPLICATION(S)

The present application claims priority of U.S. Provisional Application No. 61/381,795, filed Sep. 10, 2010, the entire contents of which are hereby incorporated by reference.

TECHNICAL FIELD

The present invention relates to lighting, and more specifically, to directly driven high efficiency solid state light source circuits.

BACKGROUND

The development of solid state light sources, including but not limited to light emitting diodes (LEDs), organic LEDs (OLEDs), polymer LEDs (PLEDs), and the like, has led to use of such devices in various lighting fixtures. In general, an LED is a current driven device, i.e. the brightness of the light output of an LED may be directly related to the current supplied to the LED. However, the current through an LED should be limited to a design maximum to avoid over-current damage or failure of the LED. Typically, single LED light sources operate at only 2 to 4 volts and therefore require a low voltage power supply to power them. Furthermore, the current through the LED is strongly dependent on the applied voltage and also on the temperature of the LED. For this reason, LED light sources are powered by a circuit which transforms the main voltage to a level useable by the LED light source, and also controls the current. An additional function of the circuit is to condition the current drawn from the mains supply to present the mains with a high power factor load having low harmonic distortion.

In general, it may be desirable to operate multiple LEDs in order to achieve a higher total light output level. In this case, strings of LEDs may be connected in series and powered by a circuit that is able to supply the voltage needed and maintain the desired current level. Such a circuit is typically a complex piece of electronic equipment with a number of components, including multiple inductors, power transistors, large electrolytic capacitors, and integrated circuits.

SUMMARY

Conventional circuits for driving multiple LEDs suffer from a variety of deficiencies. The large number of components needed increases cost. Some of the components, particularly the capacitors, may have low tolerance to elevated temperatures. Hence, the circuit may experience failure before any of the LEDs themselves fails, thus limiting the life of the system.

While an extremely simple circuit of a simple series resistor is an inexpensive way to power a series string of LEDs, having such a circuit may result in high harmonic distortion. Additionally, it may be an inefficient circuit, as the resistor may dissipate significant power.

The present disclosure generally relates to a system for directly driving a string of LEDs. Current through the LED string is controlled through use of switch circuits without requiring use of transformers, direct current (DC)-to-DC converters, oscillators, or other energy storage components, such as inductors, which may be typically found in ballast configurations. A system and method according to embodiment disclosed herein may be compatible with phase-cut dimmers.

The LED string may be coupled across a power source and configured to include single LEDs or separate groups of series-connected LEDs, each of which may be coupled in parallel with an associated switch circuit. A controller may control the conduction state of a switch associated with each switch circuit to manage current flow through the groups LEDs. The same or a different number of LEDs may be provided in each group, and the LEDs may be configured to output light at different colors so that the light from the LEDs mixes to provide light of a desired color, quality and/or intensity. The switch circuits may be configured to protect against damage to the switches therein in the event of the failure of one or more of the LEDs, and to protect the controller against damage from application of source voltage thereto. In addition, the controller may be configured to provide one or more control outputs that establish low harmonic distortion in the current supplied to the LED string.

A directly driven system according to embodiments disclosed herein reduces the operating electronics for an LED string to lower complexity, cost, parts count, size, and energy storage, compared to a configuration including a ballast, while achieving high efficiency, high power factor, low harmonic distortion, and protection against failure of the LEDs in the string. In addition, the LEDs in the string may be provided in groups of one or more LEDs, with different numbers of LEDs in each groups and/or different emission spectra (e.g., color) of LEDs to achieve a desired light output such as correlated color temperature, color rendering index, peak wavelength, or some other light quality parameters. Temperature tolerance and therefore reliability are also improved compared to a configuration including a typical circuit. A system or method according to embodiments described herein also allows for elimination of inrush current, instant light, and the ability to operate on a conventional "phase-cut" dimmer circuit.

In an embodiment, there is provided a system to drive light emitting diodes (LEDs). The system includes: a string of LEDs coupled across a voltage source configured to provide an input voltage, the string of LEDs comprising a plurality of separate groups of LEDs; a plurality of switch circuits, each of the switch circuits comprising a switch coupled in parallel with an associated one of the groups of LEDs to control current flow through the associated group of LEDs in response to a control signal from a controller circuit; and a switch protection circuit associated with at least one of the switches, the switch protection circuit configured to place the at least one of the switches into a conducting state in the event of failure of an LED in the associated group of LEDs, wherein the failure places the LED into an open state.

In a related embodiment, the at least one of the switches may include a metal-oxide-semiconductor field-effect transistor (MOSFET) and the switch protection circuit may include a resistor electrically coupled between the drain and the gate of the MOSFET. In another related embodiment, at least one of the groups of LEDs may include a plurality of series connected LEDs. In yet another embodiment, a first one of the groups of LEDs may include a first number of LEDs and a second one of the groups of LEDs may include a second number of LEDs, the first number being different from the second number.

In still another related embodiment, the system may further include a controller protection circuit associated with the at least one of the switches, the controller protection circuit configured to isolate the controller circuit from a voltage applied across the at least one of the switches. In a further related embodiment, the controller protection circuit may include a diode. In a further related embodiment, the at least one of the switches may be a metal-oxide-semiconductor field-effect transistor (MOSFET) and the control signal may coupled to a gate of the MOSFET through the diode.

In yet still another related embodiment, the controller circuit may include: a operational amplifier circuit configured to compare a signal representative of the current flow to a reference voltage representative of the input voltage and maintain a balance between the current flow and the input voltage by adjusting the control signal in response to the comparison; a power supply circuit configured to generate a direct current (DC) voltage from the input voltage and provide the DC voltage to a power input of the operational amplifier circuit; and a harmonic distortion control circuit configured to inject a fraction of the input voltage to the power input.

In still yet another related embodiment, a first one of the groups of LEDs may include a first number of LEDs and a second one of the groups of LEDs may include a second number of LEDs, the first number being different from the second number; and the system may further include a controller protection circuit associated with the at least one of the switches, the controller protection circuit configured to isolate the controller circuit from a voltage applied across the at least one of the switches; and the controller circuit may include: a operational amplifier circuit configured to compare a signal representative of the current flow to the a reference voltage representative of the input voltage and maintain a balance between the current flow and the input voltage by adjusting the control signal in response to the comparison; a power supply circuit configured to generate a direct current (DC) voltage from the input voltage and provide the DC voltage to a power input of the operational amplifier circuit; and a harmonic distortion control circuit configured to inject a fraction of the input voltage to the power input.

In another embodiment, there is provided a method of driving LEDs. The method includes: coupling a string of LEDs across a voltage supply configured to provide an input voltage, the string of LEDs comprising a plurality of separate groups of LEDs; configuring a plurality of switches, each of the switches being coupled in parallel with an associated one of the groups of LEDs for controlling current flow through the associated group of LEDs in response to a control signal from a controller circuit; and associating a switch protection circuit with at least one of the switches, the switch protection circuit configured to place the at least one of the switches into a conducting state in the event of failure of an LED in the associated group of LEDs, wherein the failure places the LED into an open state.

In a related embodiment, associating may include associating a switch protection circuit with at least one of the switches, the switch protection circuit configured to place the at least one of the switches into a conducting state in the event of failure of an LED in the associated group of LEDs, wherein the failure places the LED into an open state, and wherein the at least one of the switches may include a metal-oxide-semiconductor field-effect transistor (MOSFET) and the switch protection circuit may include a resistor electrically coupled between the drain and the gate of the MOSFET.

In another related embodiment, coupling may include coupling a string of LEDs across a voltage supply configured to provide an input voltage, the string of LEDs comprising a plurality of separate groups of LEDs, wherein at least one of the separate groups of LEDs may include a plurality of series connected LEDs. In still another related embodiment, coupling may include coupling a string of LEDs across a voltage supply configured to provide an input voltage, the string of LEDs including a plurality of separate groups of LEDs, wherein a first one of the groups of LEDs may include a first number of LEDs and a second one of the groups of LEDs may include a second number of LEDs, the first number being different from the second number.

In yet another related embodiment, the method may further include: associating a controller protection circuit with the at least one of the switches, the controller protection circuit configured to isolate the controller circuit from a voltage applied across the at least one of the switches. In a further related embodiment, associating a controller protection circuit may include associating a controller protection circuit with the at least one of the switches, the controller protection circuit configured to isolate the controller circuit from a voltage applied across the at least one of the switches, wherein the controller protection circuit may include a diode. In a further related embodiment, associating a controller protection circuit may include associating a controller protection circuit with the at least one of the switches, the controller protection circuit configured to isolate the controller circuit from a voltage applied across the at least one of the switches, wherein the at least one of the switches is a metal-oxide-semiconductor field-effect transistor (MOSFET) and the control signal is coupled to a gate of the MOSFET through the diode.

In still yet another related embodiment, configuring may include configuring a plurality of switches, each of the switches being coupled in parallel with an associated one of the groups of LEDs for controlling current flow through the associated group of LEDs in response to a control signal from a controller circuit, wherein the controller circuit may include: a operational amplifier circuit to compare a signal representative of the current flow to the a reference voltage representative of the input voltage and maintain a balance between the current flow and the input voltage by adjusting the control signal in response to the comparison; a power supply circuit configured to generate a direct current (DC) voltage from the input voltage and provide the DC voltage to a power input of the operational amplifier circuit; and a harmonic distortion control circuit configured to inject a fraction of the input voltage to the power input.

In yet still another related embodiment, coupling may include coupling a string of LEDs across a voltage supply configured to provide an input voltage, the string of LEDs comprising a plurality of separate groups of LEDs, wherein a first one of the groups of LEDs may include a first number of LEDs and a second one of the groups of LEDs may include a second number of LEDs, the first number being different from the second number; and the method may further include: associating a controller protection circuit with the at least one of the switches, the controller protection circuit configured to isolate the controller circuit from a voltage applied across the at least one of the switches, wherein the controller circuit may include: a operational amplifier circuit to compare a signal representative of the current flow to the a reference voltage representative of the input voltage and maintain a balance between the current flow and the input voltage by adjusting the control signal in response to the comparison; a power supply circuit configured to generate a direct current (DC) voltage from the input voltage and provide the DC voltage to a power input of the operational amplifier circuit; and a harmonic distortion control circuit configured to inject a fraction of the input voltage to the power input.

BRIEF DESCRIPTION OF THE DRAWINGS

The foregoing and other objects, features and advantages disclosed herein will be apparent from the following descrip

FIGS. 9-12 are block flow diagrams of methods according to embodiments disclosed herein.

DETAILED DESCRIPTION

Embodiments as described herein drive one or more solid state light sources. The one or more solid state light sources may be, but are not limited to, one or more light emitting diodes (LEDs), organic light emitting diodes (OLEDs), polymer light emitting diodes (PLEDs), and the like. Though embodiments may be, and in some cases are, described herein with reference to LEDs, any type of solid state light source and/or sources may be used without departing from the scope of the invention.

Figure 1:
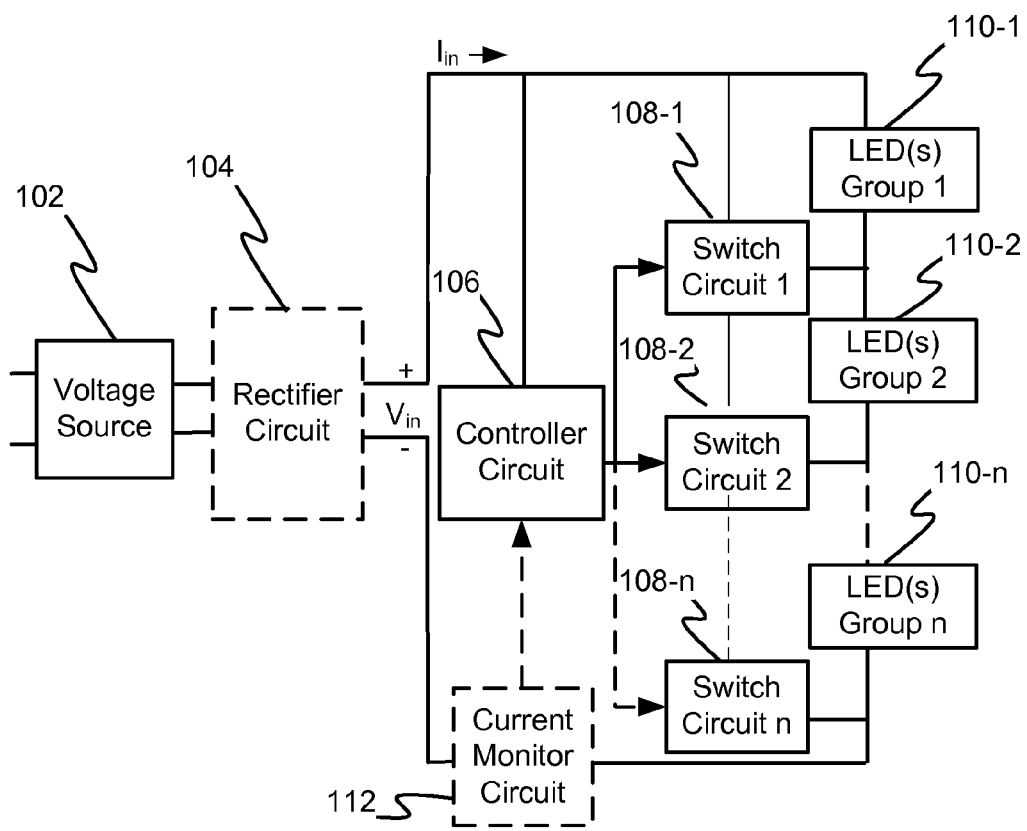
- FIG. 1 is a block diagram of a system according to embodiments disclosed herein.

FIG. 1 is a block diagram of a system 100 that includes a plurality of groups of LEDs 110-1, 110-2, . . . 110-n and a plurality of switch circuits 108-1, 108-2, . . . 108-n. Each of the switch circuits is coupled in parallel with an associated one of the plurality of groups of LED(s) 110-1, 110-2 . . . 110-n. As used herein a "group" of LED(s) may include a plurality, i.e. two or more, LEDs coupled in series, parallel, parallel combinations of series LEDs, or a single LED. Although embodiments refer to, and the figures illustrate, "n" groups of LED(s), any number, i.e. one or more, of groups of LED(s) may be provided in a system without departing from the scope of the invention.

Current $I_{in}$ for driving the plurality of groups of LED(s) 110-1, 110-2 . . . 110-n is provided by a voltage source 102. The voltage source 102 may be configured as a mains power source (e.g. 120VAC, 60 Hz) or any other type of alternating current (AC) power source, or a direct current (DC) power source, such as for example a vehicle battery, or any other suitable power source. An optional rectifier circuit 104 may be provided, in the case where the voltage source 102 is an AC power source such as mains power, to provide a rectified input voltage $V_{in}$. The rectifier circuit 104 may be any type of rectifying component or group of components, such as a well-known bridge rectifier.

The voltage source 102 is provided across the plurality of switch circuits 108-1, 108-2 . . . 108-n and across the LED(s) in the plurality of groups of LED(s) 110-1, 110-2 . . . 110-n. In general, each of the switch circuits in the plurality of switch circuits 108-1, 108-2 . . . 108-n has a conduction state depending on a control signal from a controller circuit 106 and the voltage across an associated one of the plurality of groups of LED(s) 110-1, 110-2 . . . 110-n. When a switch circuit (e.g., the switch circuit 108-1) in the plurality of switch circuits 108-1, 108-2 . . . 108-n is in a non-conducting (i.e., open) state, current flows through the group of LED(s) (e.g., a first group of LEDs 110-1) in the plurality of groups of LEDs 110-1, 110-2 . . . 110-n associated therewith, which energizes the LEDs in that group so that they emit light. When a switch circuit (e.g., the switch circuit 108-1) in the plurality of switch circuits 108-1, 108-2 . . . 108-n is in a conducting state (i.e., closed), current is bypassed/shunted around the group of LED(s) (e.g., a first group of LEDs 110-1) in the plurality of groups of LEDs 110-1, 110-2 . . . 110-n associated therewith, so the LED(s) in that group are not energized and do not emit light. In various embodiments, switch circuits in the plurality of switch circuits 108-1, 108-2 . . . 108-n and/or switches performing equivalent functionality may bypass current around the associated group(s) of LED(s) in the plurality of groups of LEDs 110-1, 110-2 . . . 110-n or shunt current to the return, or perform any combination of these. In some embodiments, to be described more fully below, the plurality of switch circuits 108-1, 108-2, . . . 108-n open and close directly in response to changing voltage across the associated plurality of groups of LEDs 110-1, 110-2 . . . 110-n with additional fine adjustments to current flow provided by the controller circuit 106 through variation of the control signal.

An optional current monitor circuit 112 may be employed to provide current sense input to the controller circuit 106, such that the controller circuit 106 may limit total current through LEDs in the plurality of groups of LEDs 110-1, 110-2 . . . 110-n to prevent damage in the event of a spike in the voltage source 102. The controller circuit 106 may also use the current sense input in combination with active feedback to regulate the current flow through LEDs in the plurality of groups of LEDs 110-1, 110-2 . . . 110-n, such that the current flow more closely follows the input voltage. This maintains a high power factor and reduced harmonic distortion in the system 100. The controller circuit 106 may regulate the current flow through adjustment of the control signal.

Figure 2:
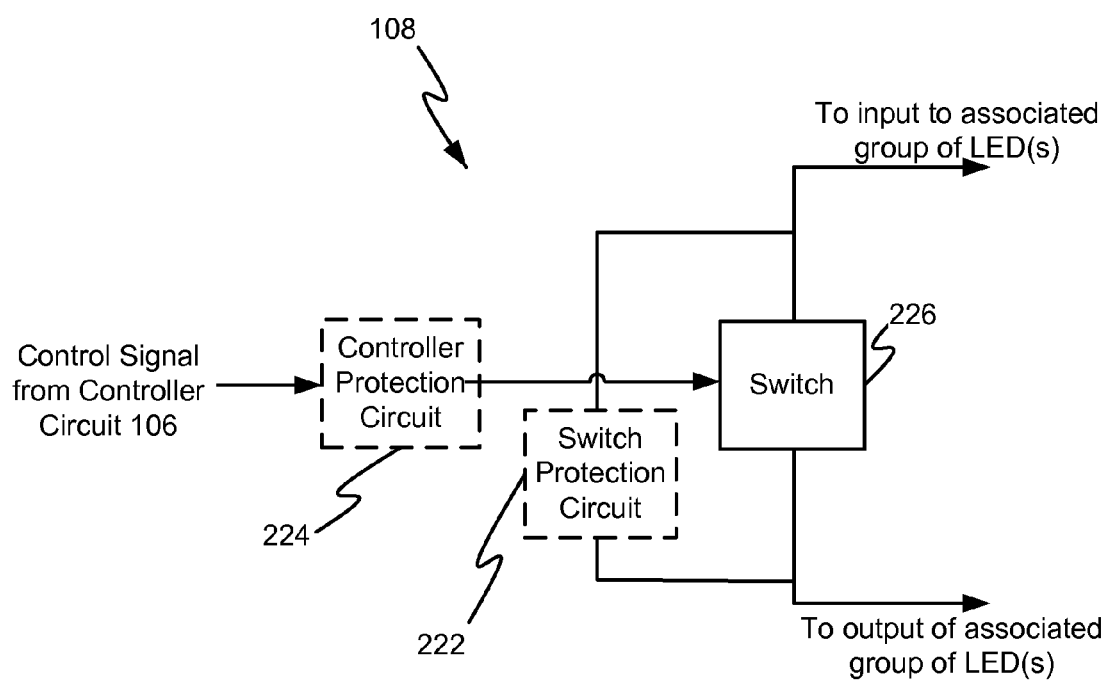
FIG. 2 is a block diagram of a switch circuit according to embodiments disclosed herein.

Turning now to FIG. 2, there is provided a block diagram of a switch circuit 108, such as but not limited to one of the switch circuits in the plurality of switch circuits 108-1, 108-2, . . . 108-n shown in FIG. 1. In FIG. 2, the switch circuit 108 includes a switch 226 for coupling across an associated group of LED(s) (e.g. the group of LED(s) 110-n shown in FIG. 1), an optional switch protection circuit 222 coupled to the switch 226, and an optional controller protection circuit 224. The switch 226 may be any type of switching device, such as a bi-polar junction transistor (BJT), metal oxide field effect transistor (MOSFET) etc., capable of changing conduction states in response to a control input, such as the control signal from the controller circuit 106. For example, in an embodiment where the switch 226 is a MOSFET, the control signal may be coupled to the gate of the MOSFET while the source and drain may be coupled across the group of LED(s) associated therewith.

The control signal may be coupled to the switch 226 through the optional controller protection circuit 224. The controller protection circuit 224 is configured to prevent potential damage to the controller circuit 106 resulting from application of high voltages thereto from the switch 226. The controller protection circuit 224 may include any component or combination of components that would prevent application of damaging voltage to the controller circuit 106 through the control signal path. In some embodiments, for example, the controller protection circuit 224 may be a high-voltage diode.

The optional switch protection circuit 222 may be coupled to the switch 226 to prevent potential damage to the switch 226 resulting from application of high voltages thereto, e.g. in the event one of the LED(s) in the group of LED(s) associated therewith fails in an open state. The switch protection circuit 222 may include any component or combination of components that would place the switch 226 in a conducting state to prevent damage thereto. In some embodiments, for example, the switch protection circuit 222 may include one or more resistors configured to force the switch 226 into a conducting state if an LED failed in an open state. In embodiments where the switch 226 is a MOSFET, for example, the switch protection circuit 222 may be a resistor coupled between the gate and the drain of the MOSFET.

Figure 3:
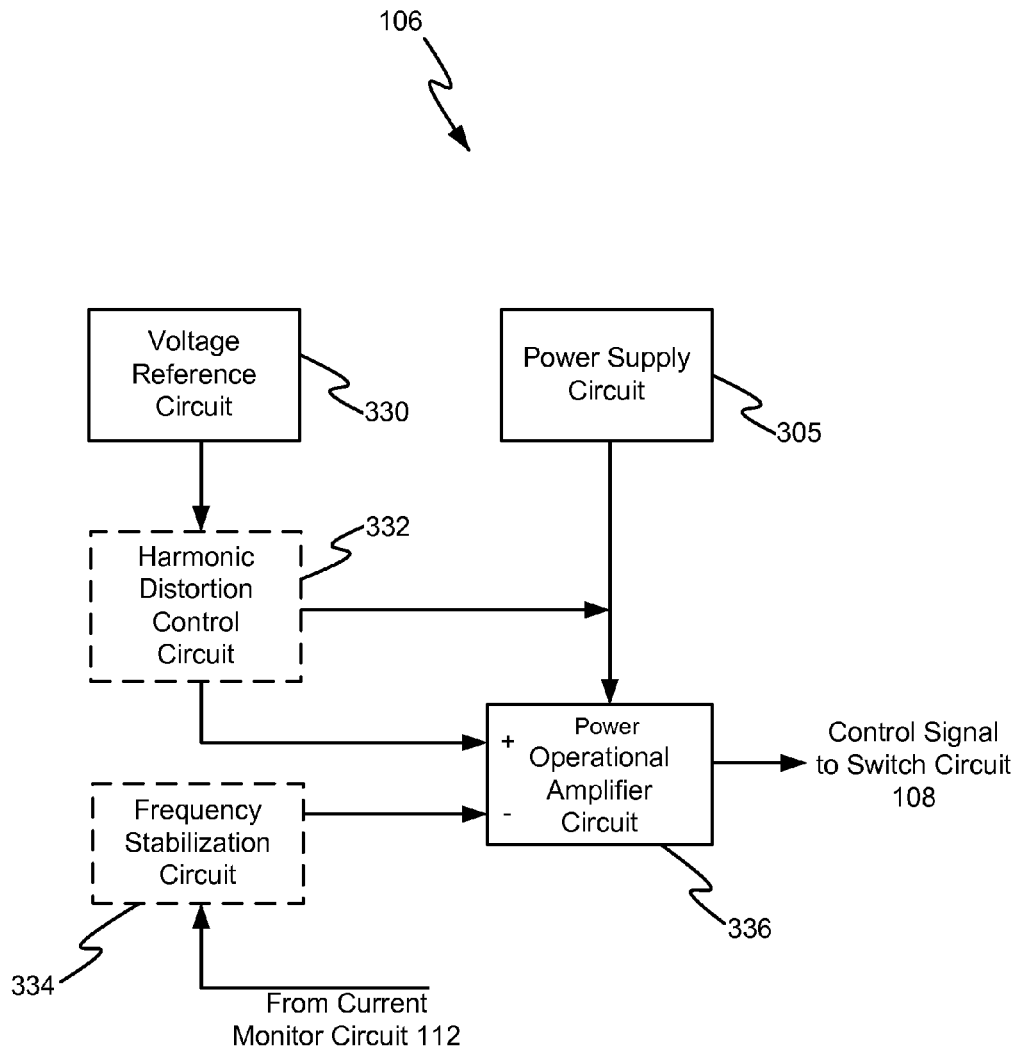
FIG. 3 is a block diagram of a controller circuit according to embodiments disclosed herein.

FIG. 3 is a block diagram of a controller circuit 106 that includes an operational amplifier circuit 336, a power supply circuit 305 to supply power to the operational amplifier circuit 336, a voltage reference circuit 330 coupled to an optional harmonic distortion control circuit 332, and an optional frequency stabilization circuit 334. The power supply circuit 305 may be a known DC power supply circuit configuration and, in some embodiments, may supply power, either directly or indirectly, from the voltage source 102. The voltage reference circuit 330 is configured to provide a voltage that is based on a fraction of the voltage provided by the voltage source 102. In some embodiments, this fraction may be adjustable, thus enabling variations in the current through the string of LED(s), and therefore average power, of the system 100. This fractional voltage is provided to the harmonic distortion control circuit 332, which couples that signal to the non-inverting input of operational amplifier circuit 336. The harmonic distortion control circuit 332 may also provide an additional DC component to the positive power input of the operational amplifier circuit 336 to compensate for voltage drops in the voltage source 102, which may improve the power factor and reduce harmonic distortion of the system 100.

The output of the current monitor circuit 112 (shown in FIG. 1), which monitors current flow through LED(s) in the plurality of groups of LED(s) 110-1, 110-2, . . . 110-$n$, is coupled through the frequency stabilization circuit 334 to the inverting input of the operational amplifier circuit 336. The operational amplifier circuit 336 maintains a balance between the monitored LED current flow and the input voltage from the voltage source 102 by adjusting the control signal that it provides to switch circuit(s) in the plurality of switch circuits 108-1, 108-2, . . . 108-$n$ shown in FIG. 1. The frequency stabilization circuit 334 adjusts the frequency response of the operational amplifier circuit 336 to avoid undesirable oscillations. In some embodiments, the frequency stabilization circuit 334 may include a resistor-capacitor (RC) network and the current monitor circuit 312 may include a current sensing resistor.

Figure 4:
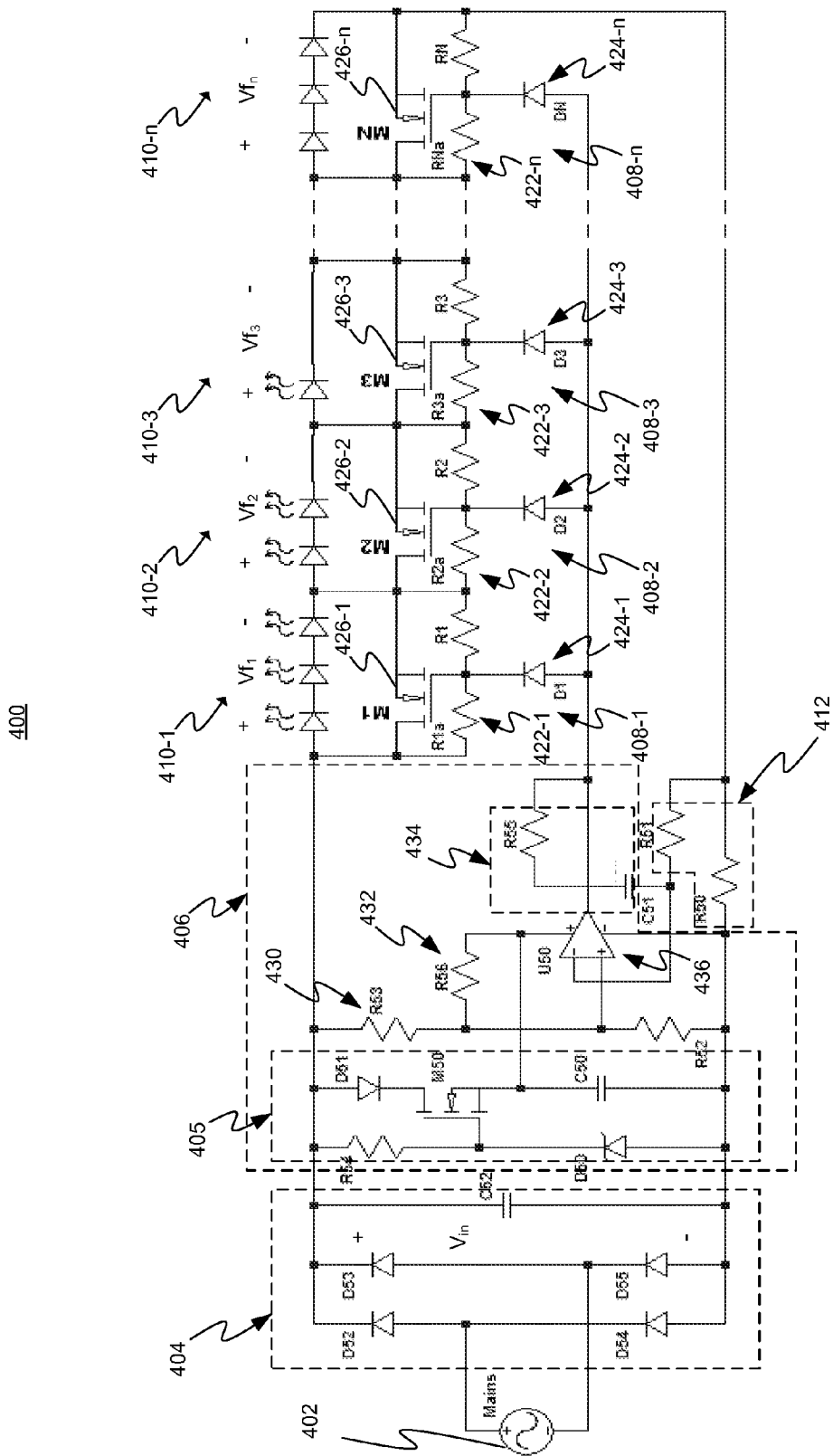
FIG. 4 is a schematic circuit diagram illustrating an LED circuit according to embodiments disclosed herein.

FIG. 4 is a circuit diagram of an embodiment of an LED circuit 400 including a power source 402, a rectifier circuit 404, a controller circuit 406, a current monitor circuit 412 including resistors R50 and R51, a string of LEDs including a plurality of groups of LED(s) 410-1, 410-2, 410-3 . . . 410-$n$, and a plurality of switch circuits 408-1, 408-2, 408-3 . . . 408-$n$. Each of the switch circuits in the plurality of switch circuits 408-1, 408-2, 408-3 . . . 408-$n$ is coupled in parallel with an associated one of the groups of LED(s) in the plurality of groups of LED(s) 410-1, 410-2, 410-3 . . . 410-$n$. For example, the switch circuit 408-1 is coupled in parallel with the LED group 410-1. The power source 402 is a "mains" power source configured to provide an AC voltage, e.g. 120VAC at 60 Hz, to the rectifier circuit 404. The rectifier circuit 404 includes diodes D52, D53, D54, and D55 along with a capacitor C52 arranged in a well-known bridge rectifier configuration. The rectifier circuit 404 provides a rectified input voltage $V_{in}$ across the capacitor C52.

The controller circuit 406 includes a power supply circuit 405, a voltage reference circuit 430 including resistors R52 and R53, a harmonic distortion control circuit 432 including a resistor R56, an operational amplifier circuit 436 including an operational amplifier U50, and a frequency stabilization circuit 434 including a resistor R55 and a capacitor C51. The supply voltage for the operational amplifier circuit 436 is provided by the power supply circuit 405. The power supply circuit 405 includes a resistor R54, a Zener diode D50, a diode D51, a capacitor C50, and a MOSFET M50 coupled to the output of the rectifier circuit 404 and provided in a known configuration for providing a low voltage, e.g. 5V, DC supply voltage across the capacitor C50, which is coupled to the power supply input of the operational amplifier U50.

The resistors R52 and R53 of the voltage reference circuit 430 are provided in a voltage divider configuration with the junction between the resistor R52 and the resistor R53 coupled to the non-inverting input of the operational amplifier U50 as a voltage reference signal. The output of the current monitor circuit 412, i.e. the voltage across the resistor R51, is representative of the current through the plurality of groups of LED(s) 410-1, 410-2, 410-3 . . . 410-$n$, as sampled through the resistor R51, and is coupled to the inverting input of the operational amplifier U50. The output of the frequency stabilization circuit 434 is also coupled to the inverting input of the operational amplifier U50. The frequency stabilization circuit 434 includes the capacitor C51 and the resistor R55 coupled to the output of the operational amplifier U50, i.e. the control signal output of the controller circuit 406, and functions to avoid undesirable oscillations in the control signal output.

To improve the power factor of the circuit 400, the output of the harmonic distortion control circuit 432 is coupled to the power supply input of the operational amplifier U50 along with the output of the power supply circuit 405. The harmonic distortion control circuit 432 includes the resistor R56 coupled between the power supply input of the operational amplifier U50 and the junction between the resistor R53 and the resistor R52 and the non-inverting input of the operational amplifier U50. This configuration compensates for voltage drops in the rectifier circuit 404 and improves power factor. An improved power factor may also reduce harmonic distortion.

In FIG. 4, the operational amplifier circuit 436 maintains a balance between the current through the plurality of groups of LED(s) 410-1, 410-2, 410-3 . . . 410-$n$, as sampled through the resistor R51 of the current sense circuit 412, and the voltage reference signal provided by the voltage reference circuit 430. The root-mean-squared (RMS) current through the plurality of groups of LED(s) 410-1, 410-2, 410-3 . . . 410-$n$ may be adjusted by adjusting the value of the resistor R52.

Each of the switch circuits in the plurality of switch circuits 408-1, 408-2, 408-3 . . . 408-$n$ includes an associated switch 426-1, 426-2, 426-3 . . . 426-$n$, which is a MOSFET in the illustrated embodiment of FIG. 4. The source and drain of each MOSFET switch 426-1, 426-2, 426-3 . . . 426-$n$ are coupled across the LED(s) of an associated one of the plurality of groups of LED(s) 410-1, 410-2, 410-3 . . . 410-$n$. Thus, when one of the MOSFET switches is in a conducting state, current through the group of LED(s) in the plurality of groups of LED(s) 410-1, 410-2, 410-3 . . . 410-$n$ associated therewith is shunted through the switch so that the LED(s) in that group are not energized and do not emit light. When one of the MOSFET switches is in a non-conducting state, current flows through the group of LED(s) in the plurality of groups of LED(s) 410-1, 410-2, 410-3 . . . 410-$n$ associated therewith to energize the LED(s) in that group so they emit light.

To prevent damage resulting from the rectified mains voltage being applied to a non-conducting MOSFET switch 426-1, 426-2, 426-3 ... 426-n when one or more of the LED(s) in a group of LED(s) in the plurality of groups of LED(s) 410-1, 410-2, 410-3 ... 410-n fails in an open state, each switch circuit in the plurality of switch circuits 408-1, 408-2, 408-3 ... 408-n includes an associated switch protection circuit in a plurality of switch protection circuits 422-1, 422-2, 422-3 ... 422-n. In FIG. 4, the switch protection circuits in the plurality of switch protection circuits 422-1, 422-2, 422-3 ... 422-n include an associated resistor in a plurality of resistors R1a, R2a, R3a ... Rna coupled between the drain and gate of the associated MOSFET switch 426-1, 426-2, 426-3 ... 426-n to place the switch in a conducting state if one or more of the LED(s) in the groups of LED(s) in the plurality of groups of LED(s) 410-1, 410-2, 410-3 ... 410-n fails open. An additional resistor in a further plurality of resistors R1, R2, R3 ... Rn in each switch circuit in the plurality of switch circuits 408-1, 408-2, 408-3 ... 408-n is coupled between the gate and source of each MOSFET switch 426-1, 426-2, 426-3 ... 426-n to assure the MOSFET switch 426-1, 426-2, 426-3 ... 426-n enters a non-conducting state.

The conducting state of each of the MOSFET switches 426-1, 426-2, 426-3 ... 426-n is controlled by the control signal output of the controller circuit 406, which in the illustrated embodiment is the output of the operational amplifier U50. The control signal output of the controller circuit 406 is coupled to the gates of each of the MOSFET switches 426-1, 426-2, 426-3 ... 426-n through associated controller protection circuits 424-1, 424-2, 424-3 ... 424-n. In FIG. 4, the controller protection circuits 424-1, 424-2, 424-3 ... 424-n include associated high voltage diodes D1, D2, D3 ... Dn. For any of the MOSFET switches 426-1, 426-2, 426-3 ... 426-n that are in a non-conducting state, the associated high voltage diodes D1, D2, D3 ... Dn will be reverse biased, allowing those non-conducting MOSFET switches to float to the higher voltage of the associated group of LED(s) in the plurality of groups of LED(s) 410-1, 410-2, 410-3 ... 410-n and thereby protect the controller circuit 406 from that higher voltage. The associated high voltage diodes D1, D2, D3 ... Dn are selected to handle the required voltage.

As shown, each of the groups of LED(s) in the plurality of groups of LED(s) 410-1, 410-2, 410-3 ... 410-n may include a single LED or a plurality of LEDs connected in series, parallel, or parallel combinations of series LEDs, depending on the desired light output. In general, however, for efficiency, the combined forward voltage drops of the groups of LED(s) in the plurality of groups of LED(s) 410-1, 410-2, 410-3 ... 410-n may be selected such that it is greater than the peak rectified input voltage, i.e. the output of the rectifier circuit 404. In other words, for the groups of LED(s) in the plurality of groups of LED(s) 410-1, 410-2, 410-3 ... 410-n, each with an associated forward voltage drop $Vf_i$, and a peak rectified input voltage, $V_{inpk}$:

$$\sum_{i=1}^{n} Vf_i \geq V_{pk}$$

For ease of explanation, operation of the circuit 400 may be discussed herein with respect to a switch 426 or group of LED(s) to the "left" or "right" in FIG. 4. The designations "left" and "right" are provided for convenience only and are not meant to be limiting with regard to the circuit configuration.

With continued reference to FIG. 4, at any given instantaneous rectified input voltage $V_{in}$, there will be a particular MOSFET switch, say the MOSFET switch 426-2 as an example, for which all MOSFET switches to the left, the MOSFET switch 426-1 in this example, will be in a non-conducting state, and all MOSFETS switches to the right, the MOSFET switches 426-3 through 426-n, will be in a conducting state. Consequently, all groups of LED(s) to the left of the MOSFET switch 426-2, in this example only the LED group 410-1, will be energized and all groups of LED(s) to the right of the MOSFET switch 426-2, in this example the LED groups 410-3 through 410-n, will not be energized.

The combined forward voltage drops of the groups of energized LED(s), in this example only the LED group 410-1, will be slightly less than the rectified input voltage provided by the rectifier circuit 404, and the remaining voltage drop will fall across the MOSFET switch 426-2 and its associated LED group 410-2. This voltage drop will be insufficient to operate the associated group of LED(s) 410-2 at full current, thus some of the current will be conducted by the MOSFET switch 426-2. Since there is a voltage drop across the MOSFET switch 426-2, the MOSFET switch to its left, the MOSFET switch 426-1, will have a source voltage that is higher than that of the MOSFET switch 426-2. Since the gates of all the MOSFET switches 426-1, 426-2, 426-3 ... 426-n are coupled to a common control line through associated high voltage diodes D1, D2, D3 ... Dn, the gate-to-source voltage of the MOSFET switch 426-1 will be smaller than that of the MOSFET switch 426-2 and it will conduct little or no current. A similar situation would apply to all other MOSFET switches to the left of the MOSFET switch 426-1, although there are none in this example. Additionally, the high voltage diodes, e.g. D1, coupled to the gates of the non-conducting MOSFET switches will be reverse biased, and the gate-to-source resistors, e.g. R1, will pull the gate-to-source voltage of these MOSFET switches to zero, further ensuring that they are non-conducting.

The MOSFET switches 426-1, 426-2, 426-3 ... 426-n further assist in maintaining the current flow through the group of LED(s) in the plurality of groups of LED(s) 410-1, 410-2, 410-3 ... 410-n at a specific level. If the current flow through the group of LED(s) in the plurality of groups of LED(s) 410-1, 410-2, 410-3 ... 410-n is low, the MOSFET switch 426-3 to the right of the MOSFET switch 426-2 will start to increase its resistance. This will raise the source voltage of the MOSFET switch 426-2, and the MOSFET switch 426-2 will begin to turn non-conductive. If the rectified input voltage $V_{in}$ rises, current flow will increase through the LED group 410-2 while decreasing through the associated MOSFET switch 426-2. At some point, as the rectified input voltage $V_{in}$ continues to rise, current flow through the MOSFET switch 426-2 will cease, and the current flow control function will pass to the MOSFET switch 426-3. As described previously, the controller circuit 406 may also assist in maintaining the current flow through the group of LED(s) in the plurality of groups of LED(s) 410-1, 410-2, 410-3 ... 410-n at a specific level by adjusting the control signal, and therefore the conduction state of the MOSFET switches 426-1, 426-2, 426-3 ... 426-n through active feedback from the current monitor circuit 412.

In some embodiments, the switches 426 may fulfill a dual role of short-circuiting non-operating groups of LED(s) in the plurality of groups of LED(s) 410-1, 410-2, 410-3 ... 410-n and controlling current. In other embodiments, these functions may be separated, by operating the switches 426 either fully on or off and implementing the current control through a separate pass element attached in series with the LED string.

In some embodiments, the combined forward voltage drops of the groups of LED(s) in the plurality of groups of LED(s) 410-1, 410-2, 410-3 . . . 410-n may not equal or exceed the peak rectified input voltage, i.e. the output of the rectifier circuit 404 in the illustrated embodiment. Under these circumstances, the circuit 400 may be unable to control the current flow through the group of LED(s) in the plurality of groups of LED(s) 410-1, 410-2, 410-3 . . . 410-n and damage may result. One solution to this problem is to include additional LED(s) (or other resistive elements) at the right end of the groups of LED(s) in the plurality of groups of LED(s) 410-1, 410-2, 410-3 . . . 410-n, which seldom or never operate, for the purpose of buffering occasional peaks in the voltage source 402. This solution, however, might be undesirable, aesthetically or economically.

An alternative embodiment, that may avoid the use of unlit LED(s), omits the group of LED(s) 410-n associated with the switch circuit 408-n. The number of LEDs in the groups of LED(s) 410-1, 410-2, 410-3 . . . 410-n–1 associated with the remaining switch circuits 408-1, 408-2, 408-3 . . . 408-n–1 may be selected for the normal peak rectified input voltage $V_{in}$, not including the occasional transient voltage. The switch circuit 408-n may then absorb any transients or surges since its voltage is now free to rise without the clamping action of the LED(s) that would have been in the group of LED(s) 410-n. The drain-gate resistor Rn in the switch circuit 408-n should also be omitted (or increased in value) to eliminate voltage clamping. It may be necessary to choose a higher voltage rated switch for the last switch 426-n since transients and surges may contain high voltages. Power loss associated with this mode of operation may be reduced by choosing LED(s) with a suitable forward voltage drop. Use of MOSFET switches 426-1, 426-2, 426-3 . . . 426-n with fractional ohm channel resistance will also reduce the impact on efficiency.

As previously explained, the number of LED(s) in each group of LED(s) in the plurality of groups of LED(s) 410-1, 410-2, 410-3 . . . 410-n associated with each switch circuit in the plurality of switch circuits 408-1, 408-2, 408-3 . . . 408-n may vary. In some embodiments, this may be done to achieve more uniform luminance from one end of the string of LEDs to the other. If there are a fixed number of LEDs per switch circuit 408, luminance will be highest for those LEDs that are "turned on" for the longest amount of time, i.e., LEDs at the higher voltage end of the string such as the group of LED(s) 410-1 associated with the switch circuit 408-1. More uniform luminance may be achieved by increasing the number of LEDs in each group of LED(s) from LED group 410-1 at the highest switch circuit voltage 408-1 to LED group 410-n at the lowest switch circuit voltage 408-n.

The LEDs may be driven at frequencies up to the limit imposed by the switching speed of the MOSFET switches 426 and the response time of the operational amplifier circuit 436 of the controller circuit 406, and is not restricted to line frequencies of the mains power source 402.

A circuit according to embodiments described herein may be configured for operation with a variety of input voltages based on appropriate selection of various circuit components thereof. Table 1 below identifies one example of circuit components useful in configuring the embodiment illustrated in FIG. 4 for operation (resistor values in ohms):

TABLE 1

| Component | Descriptor/Value |
|---|---|
| C50 | 1 uF |
| C51 | 10 nF |
| C52 | 1 nF |
| D1 | BAS21J |
| D2 | BAS21J |
| D3 | BAS21J |
| DN | BAS21J |
| D50 | 6.2 V Zener |
| D51 | 1N4148 |
| D52 | 1N4007 |
| D53 | 1N4007 |
| D54 | 1N4007 |
| D55 | 1N4007 |
| LED(s) | OSLON |
| Mains | 120 VAC/60 Hz |
| M1 | PMV60EN |
| M2 | PMV60EN |
| M3 | PMV60EN |
| MN | PMV60EN |
| M50 | BSP297 |
| R1a | 2700k |
| R1 | 330k |
| R2a | 2700k |
| R2 | 330k |
| R3a | 2700k |
| R3 | 330k |
| RNa | 2700k |
| RN | 330k |
| R50 | 2.7 |
| R51 | 8.2k |
| R52 | 8.2k |
| R53 | 1000k |
| R54 | 1000k |
| R55 | 2.7k |
| R56 | 3600k |
| U50 | OPA703 |

Figure 5:
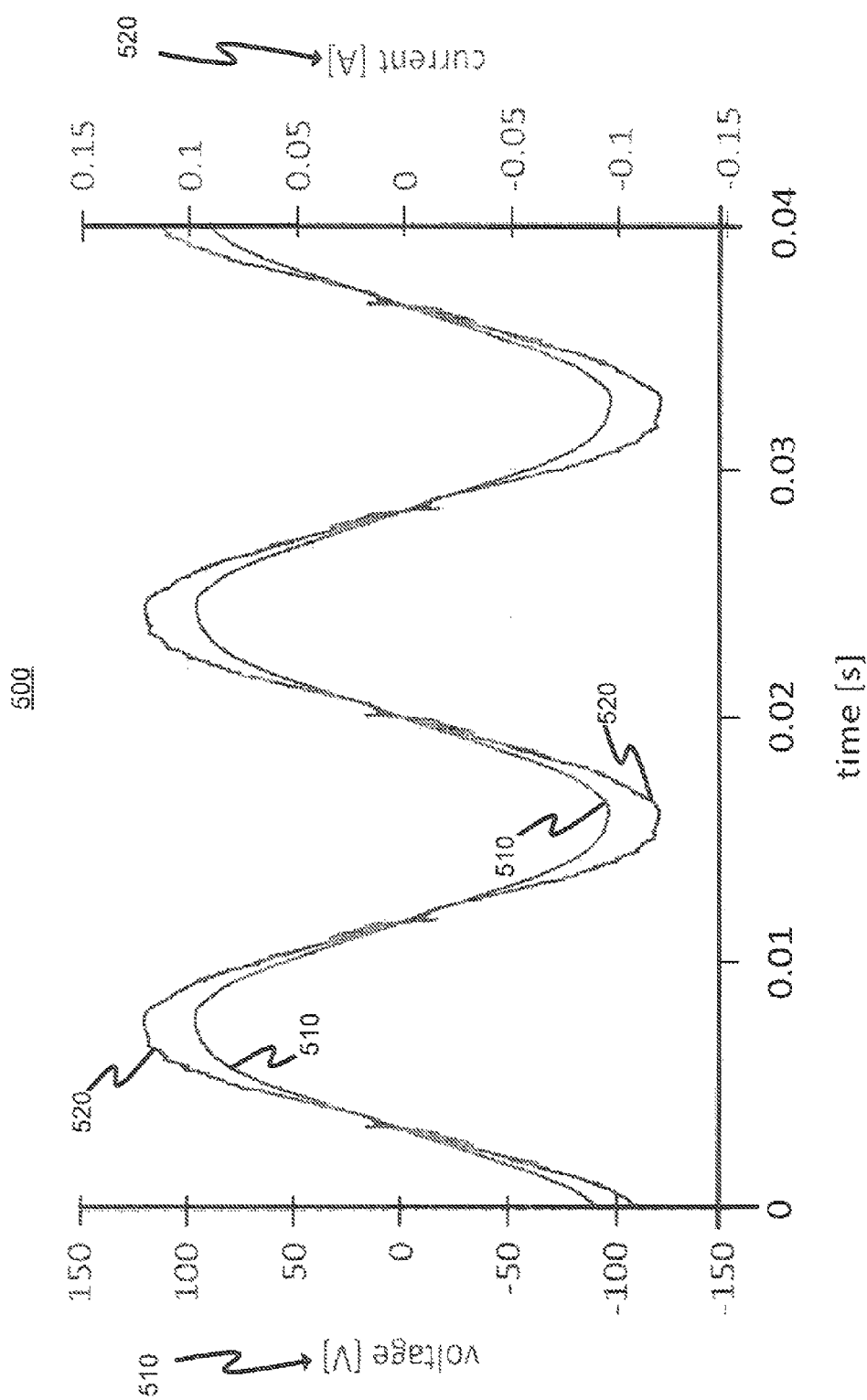
FIG. 5 is a plot of mains voltage and LED current vs. time associated with the circuit illustrated in FIG. 4.

The circuit 400 as illustrated in FIG. 4 was constructed and tested. FIG. 5 is a plot 500 of mains voltage 510 and mains current 520 versus time for that circuit as tested. The circuit operates with electrical efficiency in the 90 to 100% range, mains power factor of 99.9%, and less than 3% total harmonic distortion (THD). The current waveform closely tracks changes in the voltage waveform, indicating that the system will work with a triac-based phase cut dimmer.

Figure 6:
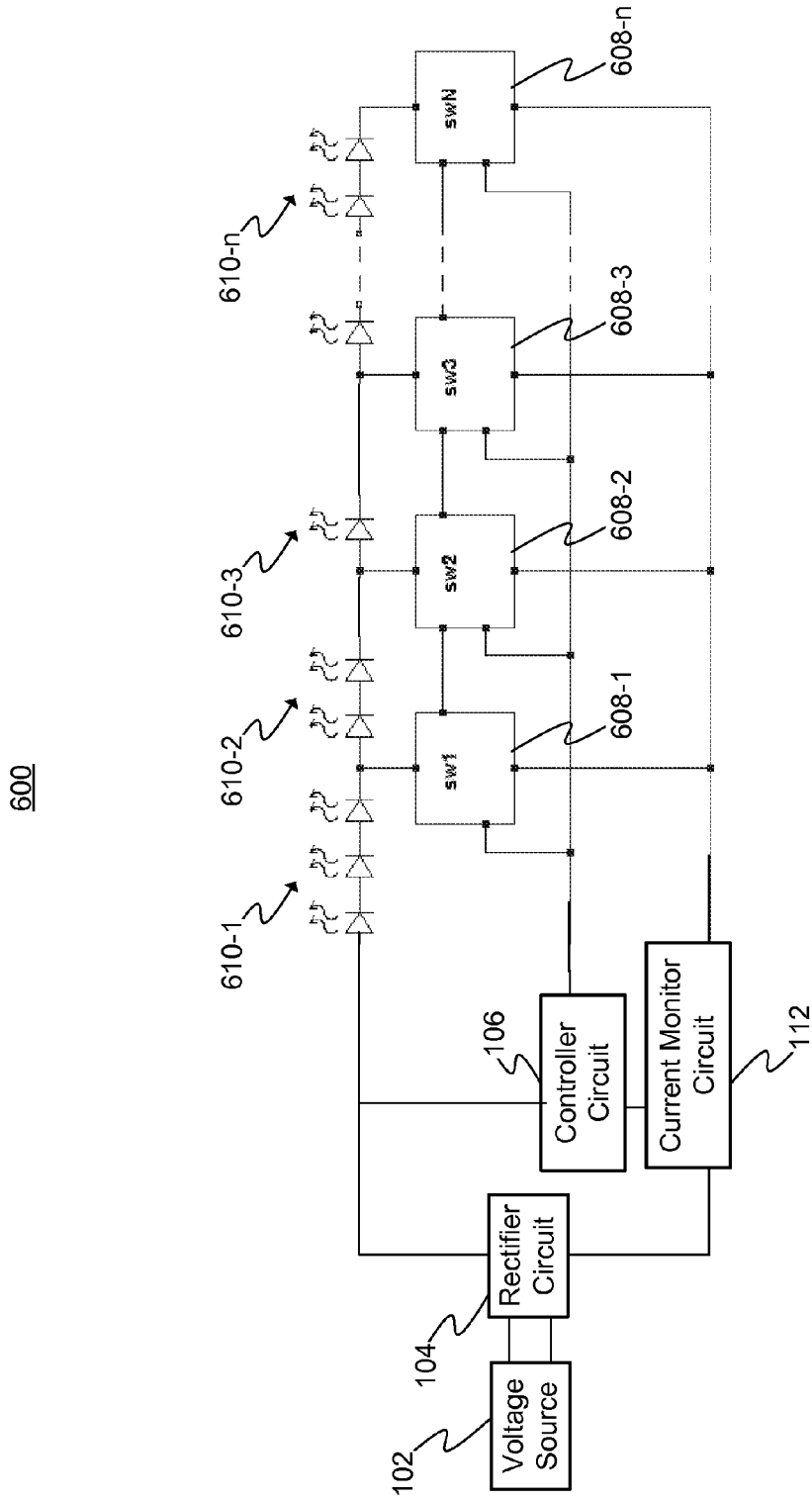
FIG. 6 illustrates a system according to embodiments disclosed herein.
Figure 7:
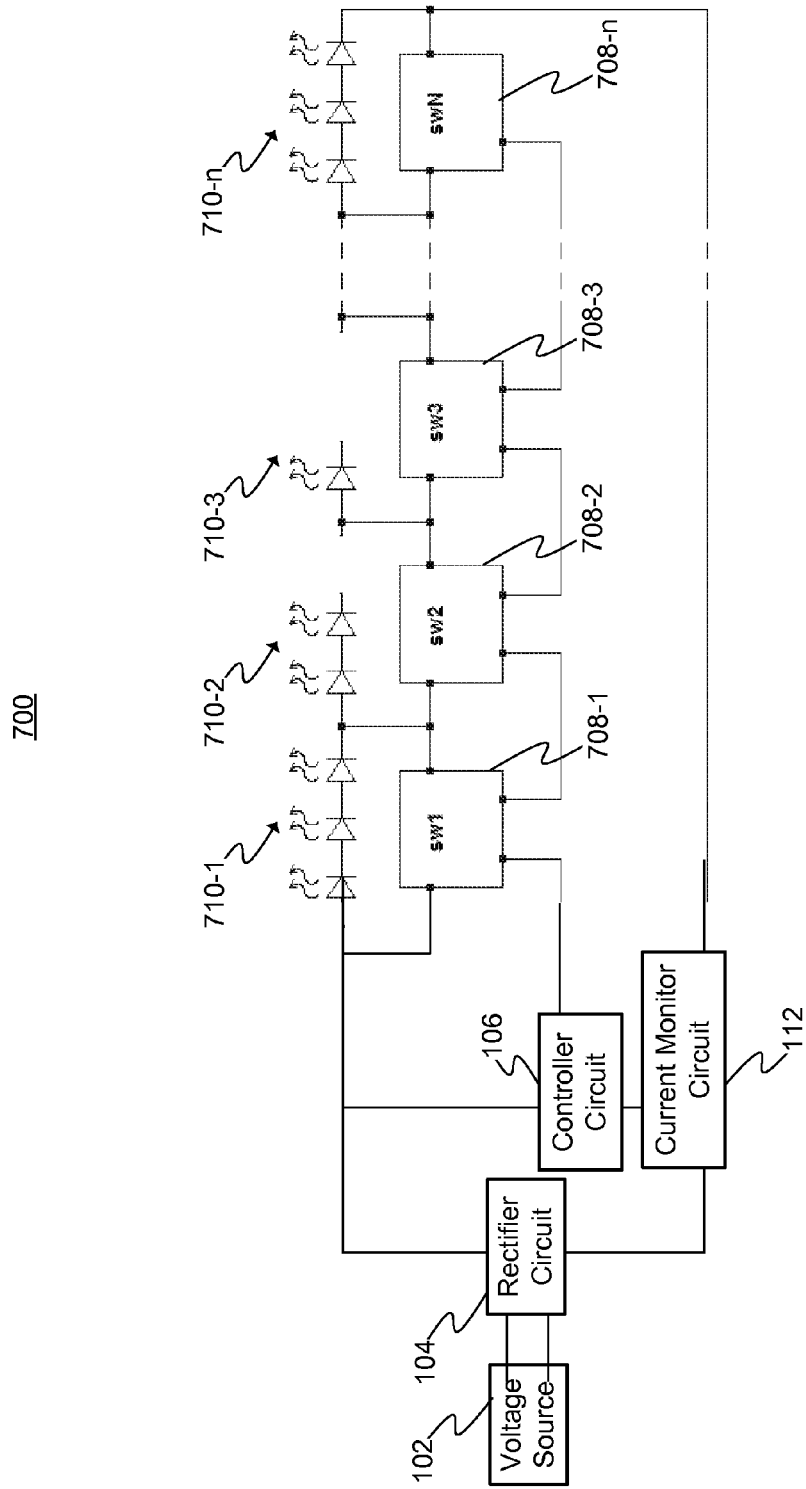
FIG. 7 illustrates another system according to embodiments disclosed herein.
Figure 8:
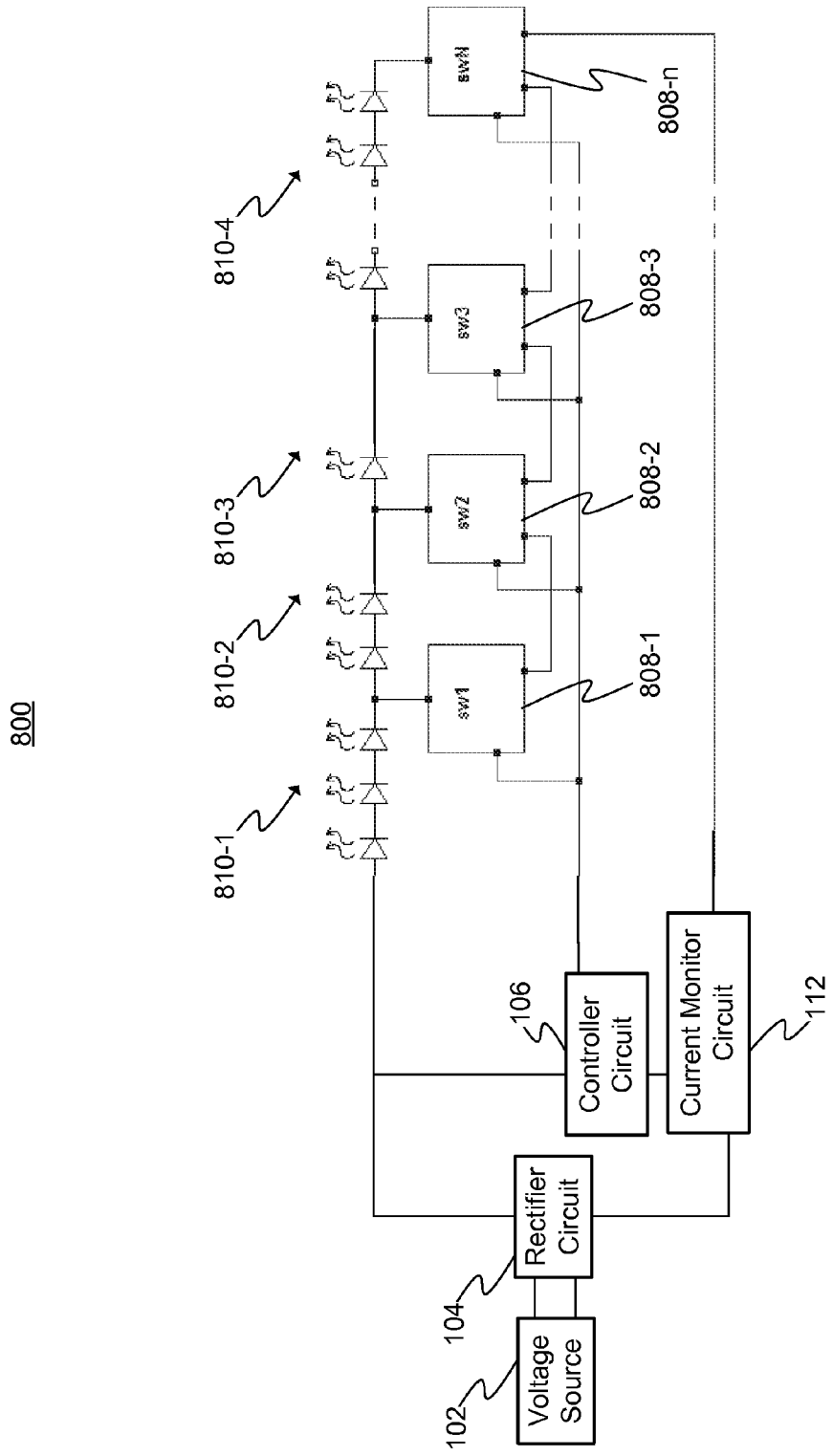
FIG. 8 illustrates another system according to embodiments disclosed herein.

FIGS. 6-8 illustrate different embodiments of possible topologies for switch circuit configurations according to embodiments described herein. The embodiments 600, 700 and 800 illustrated in FIGS. 6-8, respectively, each include a voltage source 102, a rectifier circuit 104, a controller circuit 106, and a current monitor circuit 112 as described above in connection with FIG. 1.

The embodiment 600 in FIG. 6 includes a string of groups of LED(s) 610-1, 610-2 . . . 610-n and a string of switch circuits 608-1, 608-2 . . . 608-n. In the embodiment 600, the switch circuits 608-1, 608-2 . . . 608-n are all connected to a common return path that shunts current to ground. This implementation may require switches with higher voltage ratings. The embodiment 700 in FIG. 7 includes a string of groups of LED(s) 710-1, 710-2 . . . 710-n and a string of switch circuits 708-1, 708-2 . . . 708-n. In the embodiment 700, the control signal from the controller circuit 106 is daisy chained from one switch circuit 708-1 to the next 708-2, etc. The embodiment 800 in FIG. 8 includes a string of groups of LED(s) 810-1, 810-2 . . . 810-n and a string of switch circuits 808-1, 808-2 . . . 808-n with a daisy chain return path configuration.

FIGS. 9-12 are block flow diagrams of method 900, 1000, 1100, and 1200, respectively, according to embodiments described herein. The illustrated block flow diagrams may be shown and described as including a particular sequence of steps. It is to be understood, however, that the sequence of steps merely provides an example of how the general functionality described herein can be implemented. The steps do not have to be executed in the order presented unless otherwise indicated.

A string of LEDs is coupled, step 901/1001/1101/1201, across a voltage supply configured to provide an input voltage. The string of LEDs comprises a plurality of separate groups of LEDs. In some embodiments, a string of LEDs is coupled across a voltage supply configured to provide an input voltage, the string of LEDs comprising a plurality of separate groups of LEDs, wherein at least one of the separate groups of LEDs comprises a plurality of series connected LEDs, step 905. In some embodiments, a string of LEDs is coupled across a voltage supply configured to provide an input voltage, the string of LEDs comprising a plurality of separate groups of LEDs, wherein a first one of the groups of LEDs comprises a first number of LEDs and a second one of the groups of LEDs comprises a second number of LEDs, the first number being different from the second number, step 906.

A plurality of switches is configured, step 902/1002/1102/1202, each of the switches being coupled in parallel with an associated one of the groups of LEDs for controlling current flow through the associated group of LEDs in response to a control signal from a controller circuit. In some embodiments, a plurality of switches is configured, each of the switches being coupled in parallel with an associated one of the groups of LEDs for controlling current flow through the associated group of LEDs in response to a control signal from a controller circuit, wherein the controller circuit comprises: a operational amplifier circuit to compare a signal representative of the current flow to the a reference voltage representative of the input voltage and maintain a balance between the current flow and the input voltage by adjusting the control signal in response to the comparison; a power supply circuit configured to generate a direct current (DC) voltage from the input voltage and provide the DC voltage to a power input of the operational amplifier circuit; and a harmonic distortion control circuit configured to inject a fraction of the input voltage to the power input, step 1110.

A switch protection circuit is associated with at least one of the switches, step 903/1003/1103/1203, the switch protection circuit configured to place the at least one of the switches into a conducting state in the event of failure of an LED in the associated group of LEDs, wherein the failure places the LED into an open state. In some embodiments, a switch protection circuit is associated with at least one of the switches, the switch protection circuit configured to place the at least one of the switches into a conducting state in the event of failure of an LED in the associated group of LEDs, wherein the failure places the LED into an open state, and wherein the at least one of the switches comprises a metal-oxide-semiconductor field-effect transistor (MOSFET) and the switch protection circuit comprises a resistor electrically coupled between the drain and the gate of the MOSFET, step 904.

In some embodiments, a controller protection circuit is associated with the at least one of the switches, the controller protection circuit configured to isolate the controller circuit from a voltage applied across the at least one of the switches, step 1007. Alternatively, or additionally, in some embodiments a controller protection circuit is associated with the at least one of the switches, the controller protection circuit configured to isolate the controller circuit from a voltage applied across the at least one of the switches, wherein the controller protection circuit comprises a diode, step 1008.

Alternatively, or additionally, in some embodiments a controller protection circuit is associated with the at least one of the switches, the controller protection circuit configured to isolate the controller circuit from a voltage applied across the at least one of the switches, wherein the at least one of the switches is a metal-oxide-semiconductor field-effect transistor (MOSFET) and the control signal is coupled to a gate of the MOSFET through the diode, step 1009.

In some embodiments, a string of LEDs is coupled across a voltage supply configured to provide an input voltage, the string of LEDs comprising a plurality of separate groups of LEDs, wherein a first one of the groups of LEDs comprises a first number of LEDs and a second one of the groups of LEDs comprises a second number of LEDs, the first number being different from the second number, step 1211. Further, a controller protection circuit is associated with the at least one of the switches, step 1212, the controller protection circuit configured to isolate the controller circuit from a voltage applied across the at least one of the switches, wherein the controller circuit comprises: a operational amplifier circuit to compare a signal representative of the current flow to the a reference voltage representative of the input voltage and maintain a balance between the current flow and the input voltage by adjusting the control signal in response to the comparison; a power supply circuit configured to generate a direct current (DC) voltage from the input voltage and provide the DC voltage to a power input of the operational amplifier circuit; and a harmonic distortion control circuit configured to inject a fraction of the input voltage to the power input.

As used herein, the term "circuitry" may comprise, for example, singly or in any combination, hardwired circuitry, programmable circuitry, state machine circuitry, and/or firmware that stores instructions executed by programmable circuitry.

As used herein, use of the term "nominal" or "nominally" when referring to an amount means a designated or theoretical amount that may vary from the actual amount.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A system to drive light emitting diodes (LEDs) comprising:
   a string of LEDs coupled across a voltage source configured to provide an input voltage, the string of LEDs comprising a plurality of separate groups of LEDs;
   a plurality of switch circuits, each of the switch circuits comprising a switch coupled in parallel with an associated one of the groups of LEDs to control current flow through the associated group of LEDs in response to a control signal from a controller circuit;
   a switch protection circuit associated with at least one of the switches, the switch protection circuit configured to place the at least one of the switches into a conducting state in the event of failure of an LED in the associated group of LEDs, wherein the failure places the LED into an open state; and
   a controller protection circuit associated with the at least one of the switches, the controller protection circuit configured to isolate the controller circuit from a voltage applied across the at least one of the switches and comprises a diode.

2. The system of claim 1, wherein the at least one of the switches comprises a metal-oxide-semiconductor field-effect transistor (MOSFET) and the switch protection circuit comprises a resistor electrically coupled between the drain and the gate of the MOSFET.

3. The system of claim 1, wherein at least one of the groups of LEDs comprises a plurality of series connected LEDs.

4. The system of claim 1, wherein a first one of the groups of LEDs comprises a first number of LEDs and a second one of the groups of LEDs comprises a second number of LEDs, the first number being different from the second number.

5. The system of claim 1, wherein the at least one of the switches is a metal-oxide-semiconductor field-effect transistor (MOSFET) and the control signal is coupled to a gate of the MOSFET through the diode.

6. The system of claim 1, wherein the controller circuit comprises:
   a operational amplifier circuit configured to compare a signal representative of the current flow to a reference voltage representative of the input voltage and maintain a balance between the current flow and the input voltage by adjusting the control signal in response to the comparison;
   a power supply circuit configured to generate a direct current (DC) voltage from the input voltage and provide the DC voltage to a power input of the operational amplifier circuit; and
   a harmonic distortion control circuit configured to inject a fraction of the input voltage to the power input.

7. The system of claim 1, wherein a first one of the groups of LEDs comprises a first number of LEDs and a second one of the groups of LEDs comprises a second number of LEDs, the first number being different from the second number;
   wherein the controller circuit comprises:
      a operational amplifier circuit configured to compare a signal representative of the current flow to the a reference voltage representative of the input voltage and maintain a balance between the current flow and the input voltage by adjusting the control signal in response to the comparison;
      a power supply circuit configured to generate a direct current (DC) voltage from the input voltage and provide the DC voltage to a power input of the operational amplifier circuit; and
      a harmonic distortion control circuit configured to inject a fraction of the input voltage to the power input.

8. A method of driving LEDs, comprising:
   coupling a string of LEDs across a voltage supply configured to provide an input voltage, the string of LEDs comprising a plurality of separate groups of LEDs;
   configuring a plurality of switches, each of the switches being coupled in parallel with an associated one of the groups of LEDs for controlling current flow through the associated group of LEDs in response to a control signal from a controller circuit;
   associating a switch protection circuit with at least one of the switches, the switch protection circuit configured to place the at least one of the switches into a conducting state in the event of failure of an LED in the associated group of LEDs, wherein the failure places the LED into an open state; and
   associating a controller protection circuit with the at least one of the switches, the controller protection circuit configured to isolate the controller circuit from a voltage applied across the at least one of the switches, wherein the controller protection circuit comprises a diode.

9. The method of claim 8, wherein associating comprises:
   associating a switch protection circuit with at least one of the switches, the switch protection circuit configured to place the at least one of the switches into a conducting state in the event of failure of an LED in the associated group of LEDs, wherein the failure places the LED into an open state, and wherein the at least one of the switches comprises a metal-oxide-semiconductor field-effect transistor (MOSFET) and the switch protection circuit comprises a resistor electrically coupled between the drain and the gate of the MOSFET.

10. The method of claim 8, wherein coupling comprises:
    coupling a string of LEDs across a voltage supply configured to provide an input voltage, the string of LEDs comprising a plurality of separate groups of LEDs, wherein at least one of the separate groups of LEDs comprises a plurality of series connected LEDs.

11. The method of claim 8, wherein coupling comprises:
    coupling a string of LEDs across a voltage supply configured to provide an input voltage, the string of LEDs comprising a plurality of separate groups of LEDs, wherein a first one of the groups of LEDs comprises a first number of LEDs and a second one of the groups of LEDs comprises a second number of LEDs, the first number being different from the second number.

12. The method of claim 8, wherein associating a controller protection circuit comprises:
    associating a controller protection circuit with the at least one of the switches, the controller protection circuit configured to isolate the controller circuit from a voltage applied across the at least one of the switches, wherein the at least one of the switches is a metal-oxide-semiconductor field-effect transistor (MOSFET) and the control signal is coupled to a gate of the MOSFET through the diode.

13. The method of claim 8, wherein configuring comprises:
    configuring a plurality of switches, each of the switches being coupled in parallel with an associated one of the groups of LEDs for controlling current flow through the associated group of LEDs in response to a control signal from a controller circuit, wherein the controller circuit comprises:
- a operational amplifier circuit to compare a signal representative of the current flow to the a reference voltage representative of the input voltage and maintain a balance between the current flow and the input voltage by adjusting the control signal in response to the comparison;
- a power supply circuit configured to generate a direct current (DC) voltage from the input voltage and provide the DC voltage to a power input of the operational amplifier circuit; and
- a harmonic distortion control circuit configured to inject a fraction of the input voltage to the power input.

14. The method of claim 8, wherein coupling comprises:
coupling a string of LEDs across a voltage supply configured to provide an input voltage, the string of LEDs comprising a plurality of separate groups of LEDs, wherein a first one of the groups of LEDs comprises a first number of LEDs and a second one of the groups of LEDs comprises a second number of LEDs, the first number being different from the second number;
and wherein the method further comprises:
- associating a controller protection circuit with the at least one of the switches, the controller protection circuit configured to isolate the controller circuit from a voltage applied across the at least one of the switches, wherein the controller circuit comprises:
  - a operational amplifier circuit to compare a signal representative of the current flow to the a reference voltage representative of the input voltage and maintain a balance between the current flow and the input voltage by adjusting the control signal in response to the comparison;
  - a power supply circuit configured to generate a direct current (DC) voltage from the input voltage and provide the DC voltage to a power input of the operational amplifier circuit; and
  - a harmonic distortion control circuit configured to inject a fraction of the input voltage to the power input.

15. A system to drive light emitting diodes (LEDs) comprising:
- a string of LEDs coupled across a voltage source configured to provide an input voltage, the string of LEDs comprising a plurality of separate groups of LEDs;
- a plurality of switch circuits, each of the switch circuits comprising a switch coupled in parallel with an associated one of the groups of LEDs to control current flow through the associated group of LEDs in response to a control signal from a controller circuit; and
- a switch protection circuit associated with at least one of the switches, the switch protection circuit configured to place the at least one of the switches into a conducting state in the event of failure of an LED in the associated group of LEDs, wherein the failure places the LED into an open state wherein the at least one of the switches comprises a metal-oxide-semiconductor field-effect transistor (MOSFET) and the switch protection circuit comprises a resistor electrically coupled between the drain and the gate of the MOSFET.

16. The system of claim 15, wherein at least one of the groups of LEDs comprises a plurality of series connected LEDs.

17. The system of claim 15, wherein a first one of the groups of LEDs comprises a first number of LEDs and a second one of the groups of LEDs comprises a second number of LEDs, the first number being different from the second number.

18. The system of claim 15, wherein the controller circuit comprises:
- a operational amplifier circuit configured to compare a signal representative of the current flow to a reference voltage representative of the input voltage and maintain a balance between the current flow and the input voltage by adjusting the control signal in response to the comparison;
- a power supply circuit configured to generate a direct current (DC) voltage from the input voltage and provide the DC voltage to a power input of the operational amplifier circuit; and
- a harmonic distortion control circuit configured to inject a fraction of the input voltage to the power input.

19. The system of claim 15, wherein a first one of the groups of LEDs comprises a first number of LEDs and a second one of the groups of LEDs comprises a second number of LEDs, the first number being different from the second number;
and wherein the system further comprises a controller protection circuit associated with the at least one of the switches, the controller protection circuit configured to isolate the controller circuit from a voltage applied across the at least one of the switches;
and wherein the controller circuit comprises:
- a operational amplifier circuit configured to compare a signal representative of the current flow to the a reference voltage representative of the input voltage and maintain a balance between the current flow and the input voltage by adjusting the control signal in response to the comparison;
- a power supply circuit configured to generate a direct current (DC) voltage from the input voltage and provide the DC voltage to a power input of the operational amplifier circuit; and
- a harmonic distortion control circuit configured to inject a fraction of the input voltage to the power input.

* * * * *